UNITED STATES PATENT OFFICE.

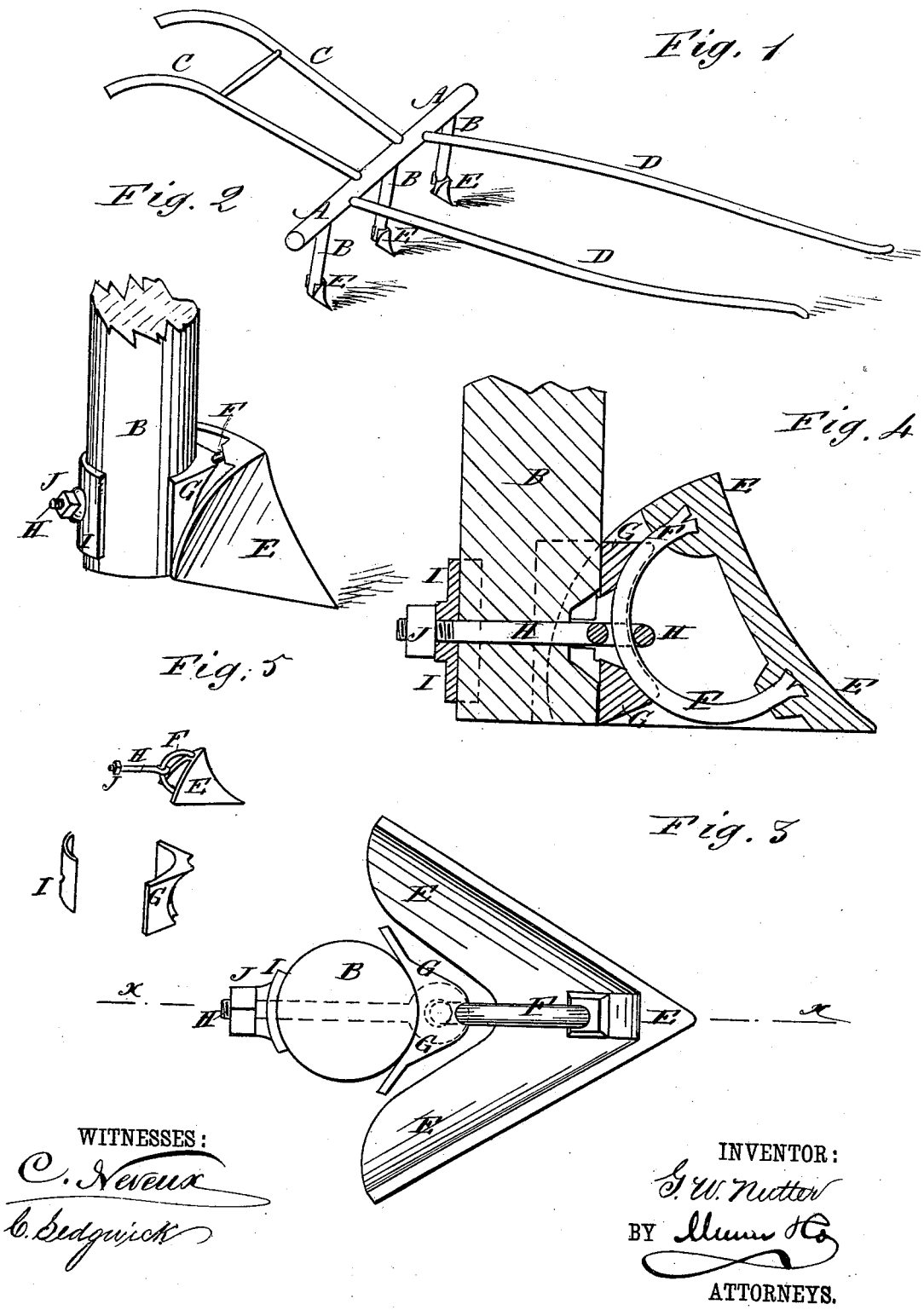

GEORGE W. NUTTER, OF CORINNA, MAINE.

FURROW-OPENER.

SPECIFICATION forming part of Letters Patent No. 262,461, dated August 8, 1882.

Application filed January 18, 1882. (Model.)

*To all whom it may concern:*

Be it known that I, GEORGE WILMOT NUTTER, of Corinna, in the county of Penobscot and State of Maine, have invented a new and useful Improvement in Adjustable Furrow-Openers, of which the following is a full, clear, and exact description.

Reference is to be had to the accompanying drawings, forming part of this specification, in which similar letters of reference indicate corresponding parts in all the figures.

Figure 1 is a perspective view of a land-marker to which my improvement has been applied. Fig. 2 is a perspective of an opener, shown as attached to a marker-leg. Fig. 3 is a bottom view of the same. Fig. 4 is a sectional side elevation of the same, taken through the line $x\,x$, Fig. 3. Fig. 5 represents the parts of the improvement detached.

The especial object of this invention is to provide adjustable furrow-openers for attachment to land-markers, to adapt the markers to open furrows of any desired depth.

The invention consists in an adjustable furrow-opener constructed with a double mold-board, a curved bar rigidly connected with the said opener, and a bearing-block, an eyebolt, and a washer for connecting the opener with a marker-leg, as will be hereinafter fully described.

A represents the cross-beam, B the legs or standards, C the handles, and D the shafts, of an ordinary land-marker.

E represents the opener, which is made with a double mold-board and double point, as shown in Figs. 2 and 3.

F is a semicircular bar, the ends of which are secured to the opener E in the upper and lower parts of its angle.

When the opener is cast it can be cast upon the ends of the bar F, and when the opener is made of plate metal the ends of the bar F can be secured to it by bolts, rivets, or other suitable means. The curved bar F fits into a correspondingly-curved recess in the forward side of a bearing-block, G, the rear side of which is concaved to fit upon a leg B of the marker. The middle part of the bearing-block G is perforated to receive the eyebolt H, through the eye of which the curved bar F passes. The eyebolt H also passes through the leg B of the marker and through a washer, I, placed upon the rear side of the marker-leg B. The washer I is curved to fit upon the rear side of the leg B. The rear side of the washer I is flattened, or has a flattened projection formed upon it, around its perforation to form a seat for the nut J, screwed upon the end of the eyebolt H.

With this construction, by loosening the nut J the opener E can be adjusted to raise or lower its point, and thus cause it to work deeper or shallower in the ground, according as it may be desired to plant the seed deeper or shallower.

With this construction, also, the point can be turned so low down that the opener will slide over roots and other obstructions in marking rough land.

Having thus fully described my invention, what I claim as new, and desire to secure by Letters Patent, is—

1. An adjustable furrow-opener, constructed substantially as herein shown and described, and consisting of the opener E, made with a double mold-board, the curved bar F, the bearing-block G, the eyebolt H, and the washer I, as set forth.

2. The combination, with the marker-leg B, of the double mold-board E, the curved bar F, the bearing-block G, the eyebolt H, and the washer I, substantially as herein shown and described, whereby the opener can be readily adjusted and will be securely held, as set forth.

GEORGE W. NUTTER.

Witnesses:
 FRANK E. DAY,
 OSCAR W. IRELAND.